(12) United States Patent
Hibbard

(10) Patent No.: US 8,167,543 B2
(45) Date of Patent: May 1, 2012

(54) METHOD OF MANUFACTURING A WIND TURBINE ROTOR BLADE

(75) Inventor: Paul Hibbard, London (GB)

(73) Assignee: Vestas Wind Systems A/S, Aarhus N (DK)

(*) Notice: Subject to any disclaimer, the term of this patent is extended or adjusted under 35 U.S.C. 154(b) by 649 days.

(21) Appl. No.: 12/359,605

(22) Filed: Jan. 26, 2009

(65) Prior Publication Data

US 2010/0135819 A1 Jun. 3, 2010

(30) Foreign Application Priority Data

Nov. 28, 2008 (GB) .................................. 0821714.3

(51) Int. Cl.
*F01D 17/00* (2006.01)

(52) U.S. Cl. ............ 415/144; 415/26; 415/145; 60/773; 60/782; 60/785

(58) Field of Classification Search ........................ None
See application file for complete search history.

(56) References Cited

U.S. PATENT DOCUMENTS

| 5,192,387 | A | 3/1993 | Buckley | |
|---|---|---|---|---|
| 2003/0146346 | A1 | 8/2003 | Chapman, Jr. | |
| 2007/0274835 | A1* | 11/2007 | Stiesdal | 416/230 |
| 2008/0277053 | A1* | 11/2008 | Stiesdal | 156/245 |

FOREIGN PATENT DOCUMENTS

| GB | 410 458 A | * | 1/2004 |
|---|---|---|---|
| JP | 60015132 | | 1/1985 |
| JP | 5220854 | | 1/1992 |
| JP | 5-220854 | | 8/1993 |
| JP | 05301295 | | 11/1993 |
| JP | 7171844 | | 7/1995 |
| JP | 8142238 | | 6/1996 |
| JP | 08258166 | | 10/1996 |
| JP | 08290481 | | 11/1996 |
| JP | 09131825 | | 5/1997 |
| JP | 2008-2229554 | * | 9/2008 |
| WO | 97/47448 | | 12/1997 |
| WO | 03/078832 | | 9/2003 |

OTHER PUBLICATIONS

Monty Siddique; Search Report issued in related Great Britain Application No. GB0821714.3; Mar. 30, 2009; 1 page; GB Intellectual Property Office.

(Continued)

*Primary Examiner* — Dung A. Le

(74) *Attorney, Agent, or Firm* — Wood, Herron & Evans, L.L.P.

(57) ABSTRACT

A method of manufacturing a wind turbine rotor blade is provided. Anticipated primary load paths within the rotor blade are predicted. Fibers of reinforcing material are dispensed onto a mold, having an orientation pattern of the fibers which is selected in dependence on the predicting step. Resin is also dispensed into the mold. A wind turbine rotor blade is provided. The blade comprises fibers of reinforcing material which are embedded in resin. The fibers are short, say in the range of 5 to 200 mm, and are orientated in dependence on an anticipated structural loading pattern of the rotor blade.

13 Claims, 2 Drawing Sheets

OTHER PUBLICATIONS

Allard Van Wallene; International Search Report and Written Opinion issued in related International Application No. PCT/GB2009/051595; Aug. 24, 2010; 11 pages; European Patent and Trademark Office.

Marty N. Vyakarnam et al.; A New Process for Aligning Chopped Fibers in Composites; Jan. 1997; pp. 35-37. Plastics Engineering.

A. Brent Strong, "Manufacturing FRP Tanks", Brigham Young Universtity.

Disclosed anonymously, Thermoplastic Fiber Chopper for the Directed Fiber Preform Process.

Chen et al., Development of automated chopper gun trajectory planning for spray forming, *Industrial Robot: An International Journal*, vol. 31, pp. 297-307, 2004.

* cited by examiner

METHOD OF MANUFACTURING A WIND TURBINE ROTOR BLADE

CROSS-REFERENCE TO RELATED APPLICATION

This application claims priority under 35 U.S.C. §119(a) to Great Britain Application No. 0821714.3, filed Nov. 28, 2008, which application is incorporated herein by reference in its entirety.

TECHNICAL FIELD

The present invention relates to a method for manufacturing a wind turbine rotor blade. In particular, it relates to a spray moulding technique.

BACKGROUND

Wind turbine rotor blades of the type illustrated in FIG. 1 often have a length in excess of 30 meters and currently weigh in the region of 5-15 tonnes, the weight of the blades is likely to increase in the future. Rotor blades are, therefore, manufactured from lightweight, yet strong, materials such as composites e.g. CFRP, GFRP. As in any commercial enterprise, it is necessary to have an efficient manufacturing process to maximise output of the rotor blades. Consequently, composite blades are typically laid up in a mould directly using sheets of material having predetermined, orientation of fibres which are generally woven together and pre-impregnated with resin. Such sheets are commonly referred to as "pre-preg" materials and are cut to the correct shape and layered up within the mould to build up part of an outer shell of the rotor blade. Each shell, or part thereof, is transferred, in its mould to an oven for curing at an elevated temperature.

FIG. 2 illustrates an example rotor blade mould and indicates, with a dashed outline, a region of particularly complex geometry where significant changes in curvature need to be achieved in the shell. Such complexity in the three dimensional geometry of the shell causes difficulty when using sheets of pre-impregnated cloth as it is necessary to avoid folds and wrinkles in the cloth. Folds and wrinkles cause fibres to be misaligned and to be bent or even broken and, as such, are particularly detrimental to the structural integrity of the finished shell component.

This region of complex curvature is also a region of significant and complex loading in an operational rotor blade. In particular, edgewise loads that are experienced along a trailing edge of the blade are transmitted through the section of the blade where the point of maximum chord is transformed to the approximately circular root portion (see FIG. 1) that attaches to the rotor hub (not shown). Careful selection of fibre orientation in such regions can significantly enhance the strength of the blade without increasing the weight of the blade.

It is, therefore, desirable to develop a method of manufacture whereby the orientation of fibres is optimised, the weight of the component is minimised and the problems outlined above are overcome.

SUMMARY

According to one aspect, the present invention provides a method of manufacturing a wind turbine rotor blade, the method comprising the steps of:
predicting anticipated primary load paths within the rotor blade;
dispensing fibres of reinforcing material onto a mould, an orientation pattern of the fibres being selected in dependence on the predicting step;
dispensing resin into the mould; and
curing the rotor blade in the mould.

By dispensing fibres directly into the mould in an orientated fashion, reflecting the anticipated loading of the finished component in use, an improved rotor blade can be manufactured. The method can be automated which, in turn, improves the accuracy, reliability and speed of manufacture. Further, the blade itself comprises an optimal fibre to resin ratio which enhances the structural integrity of the blade without increasing the weight thereof. As fibres are placed directly in the mould, kinks and folds of the fibres are avoided such that imperfections or flaws in the blade are avoided.

The two dispensing steps may happen simultaneously. The fibre dispensing step may be undertaken by a chopper gun. The lengths of the fibres may be in the range of 5 to 200 mm, preferably in the range of 5 to 50 mm.

The resin dispensing step may be undertaken by a spray forming nozzle. The resin may be a hot melt resin, which may comprise one of the group of an epoxy, a thermoplastic and a polyurethane. The ratio of resin to fibres may be selected in dependence on the predicting step.

A coating material may be applied to a surface of the mould prior to the dispensing steps.

According to a second aspect, the present invention provides a wind turbine rotor blade comprising fibres of reinforcing material embedded in resin, wherein the lengths of the fibres are in the range of 5 to 200 mm and are orientated in dependence on an anticipated structural loading pattern of the rotor blade.

The lengths of the fibres may be in the range of 5 mm to 50 mm.

According to a third aspect, the present invention provides a wind turbine installation comprising:
a tower;
a hub mounted atop the tower; and
a rotor blade, as herein before described, connected to the hub.

BRIEF DESCRIPTION OF THE DRAWINGS

The present invention will now be described in more detail, by way of example only, with reference to the accompanying drawings in which.

DETAILED DESCRIPTION

Figure 1:
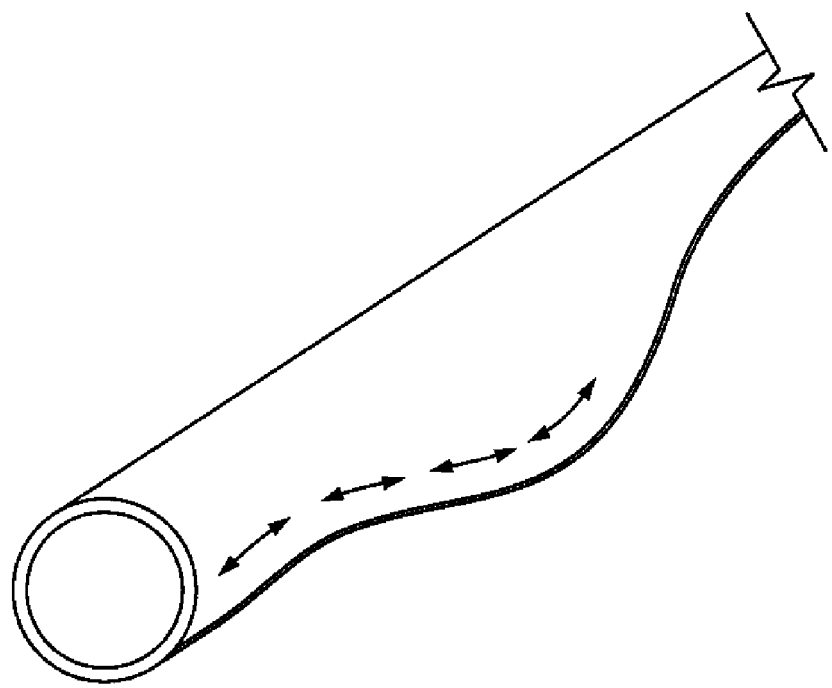
FIG. 1 illustrates a wind turbine rotor blade.
Figure 2:
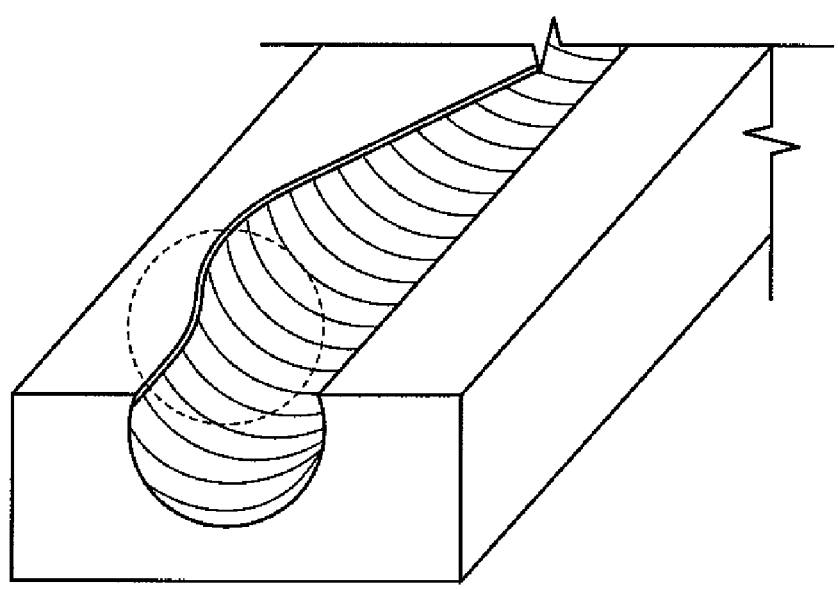
FIG. 2 represents a mould for manufacturing a rotor blade of FIG. 1.
Figure 3:
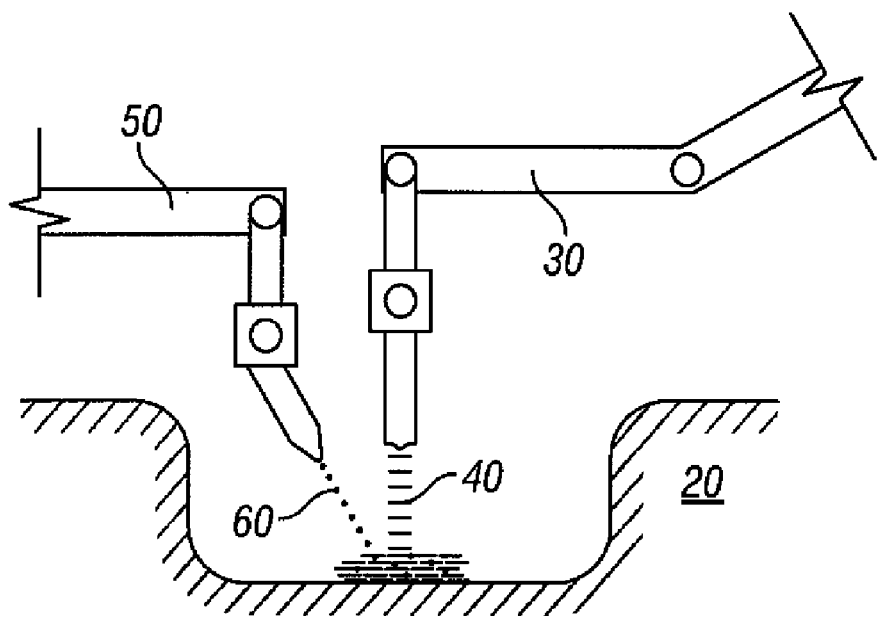
FIG. 3 represents a manufacturing method for forming a rotor blade.

FIG. 3 illustrates a method of manufacturing a wind turbine rotor blade. A mould 20, having the profile of a shell (or part of a shell) of the rotor blade is shown. A rotor blade is generally manufactured in two half shell components 10, and the mould profile represents one of these shell components. A dispensing tool 30, in this embodiment a chopper gun, is used to dispense short fibres 40 directly into the mould 20 as illustrated. Whilst referred to as being "short" the fibres 40 are significantly longer than a critical length of the fibres, say approximately 0.5 mm. The chopper gun 30 is able to dispense fibres up to 200 mm in length and in terms of the overall strength of the final material it is desirable to use fibres of longer length. However, benefits in speed and simplicity of manufacture are found in using fibres having a shorter length. Consequently, the fibres 40 may have a length in the range of 5 mm to 200 mm, and preferably have a length in the range of 5 mm to 50 mm.

The chopper gun 30 dispenses the fibres 40 in a highly orientated manner. The orientation of the fibres is pre-determined and, in particular, the pattern of the fibres 40 is selected such that optimal structural properties are achieved in the finished component 10.

A nozzle 50 is used to dispense a fine spray of hot melt resin 60 such as epoxy, polyurethane or a thermoplastic material. By producing a fine spray of resin 60 the fibres 40, carefully orientated within the mould 20, are not disturbed upon contact from the hot melt resin 60. Sufficient cooling of the hot melt resin 60 rapidly occurs so that the fibres 40 are held in place.

Liquid resin materials may be used instead of hot melt resins, however, the material must be sufficiently viscous to retain the fibres 40 in their dispensed orientation until the resin is cured. Appropriate liquid resin materials include polyurethane resin, polyester and vinylester.

Use of a fine spray of the resin combined with automated delivery of short fibres 40 enables the quantities of fibre 40 and resin 60 to be controlled in an accurate manner. The volume ratio of fibre to resin can thus be controlled and the weight of the finished component is minimised.

Provision of orientated fibres can be achieved within a tolerance of approximately ±5°. This orientation, together with the control of the fibre volume to resin volume ratio permits the strength to weight ratio to be optimised.

Figure 4:
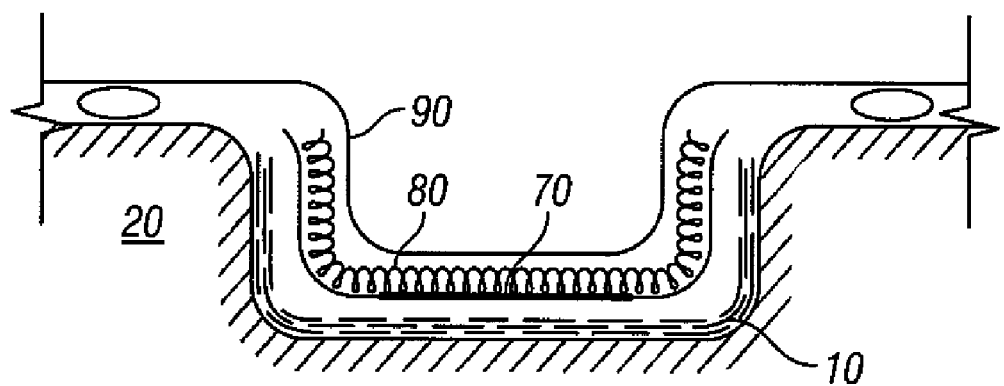
FIG. 4 represents a second stage of manufacturing the rotor blade shell.

Once the component 10 has been laid up, a bleeder membrane 70, a breather membrane 80 and a vacuum bag 90 are each applied to the component 10. The component is then vacuum consolidated and cured with heat in a conventional manner as illustrated in FIG. 4.

Very high material deposition rates can be achieved using the aforementioned method such that large components e.g. wind turbine rotor blades or parts thereof can be manufactured rapidly. The method is appropriate for complex geometries and may be used solely for the complex parts of a shell 10 or, alternatively, the method could be used for the entire shell lay-up. In the former example, pre-preg sheets could be used in a conventional manner for the remainder of the shell component 10.

If the entire shell is to be manufactured using the aforementioned method, additional chopper guns 30 and resin nozzles 50 may be implemented to further speed up the process.

A high level of automation can be achieved using the aforementioned method. Such automation leads to a corresponding improvement in accuracy and predictability of manufacture, and hence quality, of the final product.

Furthermore, automation enables complete control of the orientation of the fibres such that optimised structural design of the component 10 can be achieved. The fibres 40 can be oriented in accordance with the designer's specification such that loads may be carried in optimal directions within the finished rotor blade. Massive components, such as turbine blade shells, experience not only large aerodynamic loads but also large dynamic loads due to the weight of the turbine blade itself rotating about a rotor hub. Consequently, the structure needs to remain as light as possible as enabled by this method.

A shell 10 of a wind turbine blade is currently in the range of 25-50 meters long but it is anticipated that the lengths will increase in future. Manufacture and handling such large components can be problematic Consequently, direct application of material into the mould in which the component is to be cured, as exemplified in this method, is particularly desirable.

The fibres 40 and resin 60 may be dispensed directly onto a surface of the mould 20 or, alternatively, a layer of coating material may be provided onto the surface prior to dispensing the fibres 40 and resin 60. Such a coating material may, for example, be a gel coat for environmental protection of the rotor blade or a paint layer for decoration thereof.

By using a multitude of individual, short fibres in place of sheets of pre-formed, interwoven, pre-preg the likelihood of introducing structural defects due to the presence of folds and/or wrinkles is considerably reduced, if not eliminated.

The invention has been described with reference to specific examples and embodiments. However, it should be understood that the invention is not limited to a particular example disclosed herein but may be designed and altered within the scope of the invention and in accordance with the claims.

The invention claimed is:

1. A method of manufacturing a wind turbine rotor blade, the method comprising:
   predicting anticipated primary load paths within the rotor blade;
   dispensing individual fibres of reinforcing material onto a mould, an orientation pattern of the fibres being selected in dependence on the predicting step;
   dispensing resin into the mould; and
   curing the rotor blade in the mould.

2. The method according to claim 1, wherein the two dispensing steps happen simultaneously.

3. The method according to claim 1, wherein the fibre dispensing is undertaken by a chopper gun.

4. The method according to claim 1, wherein the lengths of the fibres are in the range of 5 to 200 mm.

5. The method according to claim 4, wherein the lengths of the fibres are in the range of 5 to 50 mm.

6. The method according to claim 1, wherein the resin dispensing is undertaken by a spray forming nozzle.

7. The method according to claim 1, wherein the resin is a hot melt resin.

8. The method according to claim 7, wherein the hot melt resin comprises one of the group of an epoxy, a thermoplastic and a polyurethane.

9. The method according to claim 1, wherein the ratio of resin to fibres is selected in dependence on the predicting step.

10. The method according to claim 1, wherein a coating material is applied to a surface of the mould prior to the dispensing steps.

11. A wind turbine rotor blade comprising fibres of reinforcing material embedded in resin, wherein the lengths of the fibres are in the range of 5 to 200 mm and are orientated in dependence on an anticipated structural loading pattern of the rotor blade.

12. The rotor blade according to claim 11, wherein the lengths of the fibres are in the range of 5 mm to 50 mm.

13. A wind turbine installation comprising:
   a tower;
   a hub mounted atop the tower; and
   a rotor blade connected to the hub, the rotor blade comprising fibres of reinforcing material embedded in resin, wherein the lengths of the fibres are in the range of 5 to 200 mm and are orientated in dependence on an anticipated structural loading pattern of the rotor blade.

* * * * *